(12) United States Patent
Salman et al.

(10) Patent No.: US 11,536,862 B2
(45) Date of Patent: Dec. 27, 2022

(54) AUTOMATIC FEATURE EXTRACTION FROM SEISMIC CUBES

(71) Applicant: Schlumberger Technology Corporation, Sugar Land, TX (US)

(72) Inventors: Nader Salman, Arlington, MA (US); Matthieu Georges Maroun Najm, Saint-Cloud (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 382 days.

(21) Appl. No.: 16/499,317

(22) PCT Filed: Jun. 22, 2018

(86) PCT No.: PCT/US2018/038920
§ 371 (c)(1),
(2) Date: Sep. 29, 2019

(87) PCT Pub. No.: WO2019/005595
PCT Pub. Date: Jan. 3, 2019

(65) Prior Publication Data
US 2021/0109242 A1    Apr. 15, 2021

Related U.S. Application Data

(60) Provisional application No. 62/558,288, filed on Sep. 13, 2017, provisional application No. 62/525,110, filed on Jun. 26, 2017.

(51) Int. Cl.
G01V 1/30 (2006.01)
G01V 1/34 (2006.01)

(52) U.S. Cl.
CPC .............. *G01V 1/302* (2013.01); *G01V 1/345* (2013.01); *G01V 2210/62* (2013.01);
(Continued)

(58) Field of Classification Search
CPC .... G01V 1/302; G01V 1/345; G01V 2210/62; G01V 2210/641; G01V 2210/642; G01V 2210/74
See application file for complete search history.

(56) References Cited

U.S. PATENT DOCUMENTS

2003/0046006 A1   3/2003   Eastwood et al.
2013/0064040 A1*  3/2013   Imhof .................... G01V 1/30
                                                  367/73
(Continued)

FOREIGN PATENT DOCUMENTS

WO   WO-2004008389 A1 *  1/2004   ............ G01V 11/00
WO   2011/077223 A2      6/2011
WO   2011/149609 A1     12/2011

OTHER PUBLICATIONS

Chopra et al., Detecting stratigraphic features via cross-plotting of seismic discontinuity attributes and their volume visualization, 2009, SEG Houston 2009 International Exposition and Annual Meeting, pp. 1082-1086 (Year: 2009).*
(Continued)

*Primary Examiner* — Mischita L Henson

(57) ABSTRACT

Methods, computing systems, and computer-readable media for interpreting seismic data, of which the method includes receiving seismic data representing a subterranean volume, and determining a feature-likelihood attribute of at least a portion of a section of the seismic data. The feature-likelihood attribute comprises a value for elements of the section, the value being based on a likelihood that the element represents part of a subterranean feature. The method also includes identifying contours of the subterranean feature based in part on the feature-likelihood attribute of the section, and determining a polygonal line that approximates the subterranean feature.

18 Claims, 19 Drawing Sheets

(52) U.S. Cl.
CPC .. *G01V 2210/641* (2013.01); *G01V 2210/642* (2013.01); *G01V 2210/74* (2013.01)

(56) References Cited

U.S. PATENT DOCUMENTS

| | | | |
|---|---|---|---|
| 2013/0081805 A1* | 4/2013 | Bradford | G01V 1/40 166/250.1 |
| 2014/0136158 A1* | 5/2014 | Hegazy | G06T 17/05 703/2 |
| 2014/0188769 A1 | 7/2014 | Lim et al. | |
| 2014/0278115 A1 | 9/2014 | Bas et al. | |
| 2015/0234067 A1 | 8/2015 | Purves et al. | |

OTHER PUBLICATIONS

International Preliminary Report on Patentability for the equivalent International patent application PCT/US2018/038920 dated Jan. 9, 2020.

Supplementary Search Report and Written Opinion of the counterpart European Patent Application No. 18823001.5 dated Feb. 22, 2021, 8 pages.

Araya-Polo, et al., "Automated fault detection without seismic processing," The Leading Edge, Mar. 2017, pp. 208-214.

Canny, "A Computational Approach to Edge Detection," IEEE Transactions on Pattern Analysis and Machine Intelligence, vol. Pami-8, No. 6, Nov. 1986, pp. 679-698.

Freidman, et al., "An Algorithm for Finding Best Matches in Logarithmic Expected Time," ACM Transactions on Mathematical Software, vol. 3, No. 3, Sep. 1977, pp. 209-226.

Hale, "Dynamic warping of seismic images," Geophysics, vol. 78, No. 2, Mar.-Apr. 2013, pp. S105-S115.

Marfurt, et al., "3-D seismic attributes using a semblance-based coherency algorithm," Geophysics, vol. 63, No. 4, Jul.-Aug. 1998, pp. 1150-1165.

Salman, "From 3D point clouds to feature preserving meshes," Modeling and Simulation,. Universite Nice Sophia Antipolis, submitted on Jan. 4, 2011, retrieved at https://tel.archives-ouvertes.fr/tel-00536984v2 (divided 3 blocks by pages).

Wu et al., "Automatically interpreting all faults, unconformities, and horizons from 3D seismic images," Interpretation, May 2016.

Zhang, et al., 2014, "Machine-learning based automated fault detection in seismic traces," Proceedings of 76th EAGE Conference and Exhibition, Amsterdam, 2014.

International Search Report and Written Opinion for the equivalent International patent application PCT/US2018/038920 dated Oct. 2, 2018.

\* cited by examiner

AUTOMATIC FEATURE EXTRACTION FROM SEISMIC CUBES

CROSS-REFERENCE TO RELATED APPLICATIONS

This application claims priority to U.S. Provisional Patent Application having Ser. No. 62/525,110, which was filed on Jun. 26, 2017. This application also claims priority to U.S. Provisional Patent Application having Ser. No. 62/558,288, which was filed on Sep. 13, 2017. The contents of these priority provisional applications are incorporated herein by reference in their entirety.

BACKGROUND

In oil and gas exploration, large amounts of seismic data in a region can be collected. The seismic data can be interpreted using many different techniques to gain insight into the structure of the subterranean domain. The seismic data is often stored in three-dimensional cubes, allowing a user to view "slices" or cross-sections of the seismic domain.

Interpreting the seismic data can include identifying various features that appear in the data. This is generally done manually, with a user reviewing vertical slices and identifying where the seismic data indicates a feature (e.g., a fault or a salt dome) may be located. The calculation and display of various seismic attributes can assist in making clearer where the features are likely to exist. However, even with the assistance of seismic attributes, extracting faults is still a time-consuming task and a laborious step in the seismic interpretation workflow. Further, such human interpretation can be subjective and may lead to inconsistent results and/or features being missed or misclassified, e.g., depending on the care and/or experience of the interpreter.

SUMMARY

Embodiments of the disclosure may provide a method for interpreting seismic data, including receiving seismic data representing a subterranean volume, and determining a feature-likelihood attribute of at least a portion of a section of the seismic data. The feature-likelihood attribute comprises a value for elements of the section, the value being based on a likelihood that the element represents part of a subterranean feature. The method also includes identifying contours of the subterranean feature based in part on the feature-likelihood attribute of the section, and determining a polygonal line that approximates the subterranean feature.

Embodiments of the disclosure may also provide a computing system including one or more processors, and a memory system including one or more non-transitory computer-readable media storing instructions that, when executed by at least one of the one or more processors, cause the computing system to perform operations. The operations include receiving seismic data representing a subterranean volume, and determining a feature-likelihood attribute of at least a portion of a section of the seismic data. The feature-likelihood attribute comprises a value for elements of the section, the value being based on a likelihood that the element represents part of a subterranean feature. The operations also include identifying contours of the subterranean feature based in part on the feature-likelihood attribute of the section, and determining a polygonal line that approximates the subterranean feature.

Embodiments of the disclosure may further provide a non-transitory computer-readable medium storing instructions that, when executed by one or more processors of a computing system, cause the computing system to perform operations. The operations include receiving seismic data representing a subterranean volume, and determining a feature-likelihood attribute of at least a portion of a section of the seismic data. The feature-likelihood attribute comprises a value for elements of the section, the value being based on a likelihood that the element represents part of a subterranean feature. The operations also include identifying contours of the subterranean feature based in part on the feature-likelihood attribute of the section, and determining a polygonal line that approximates the subterranean feature.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
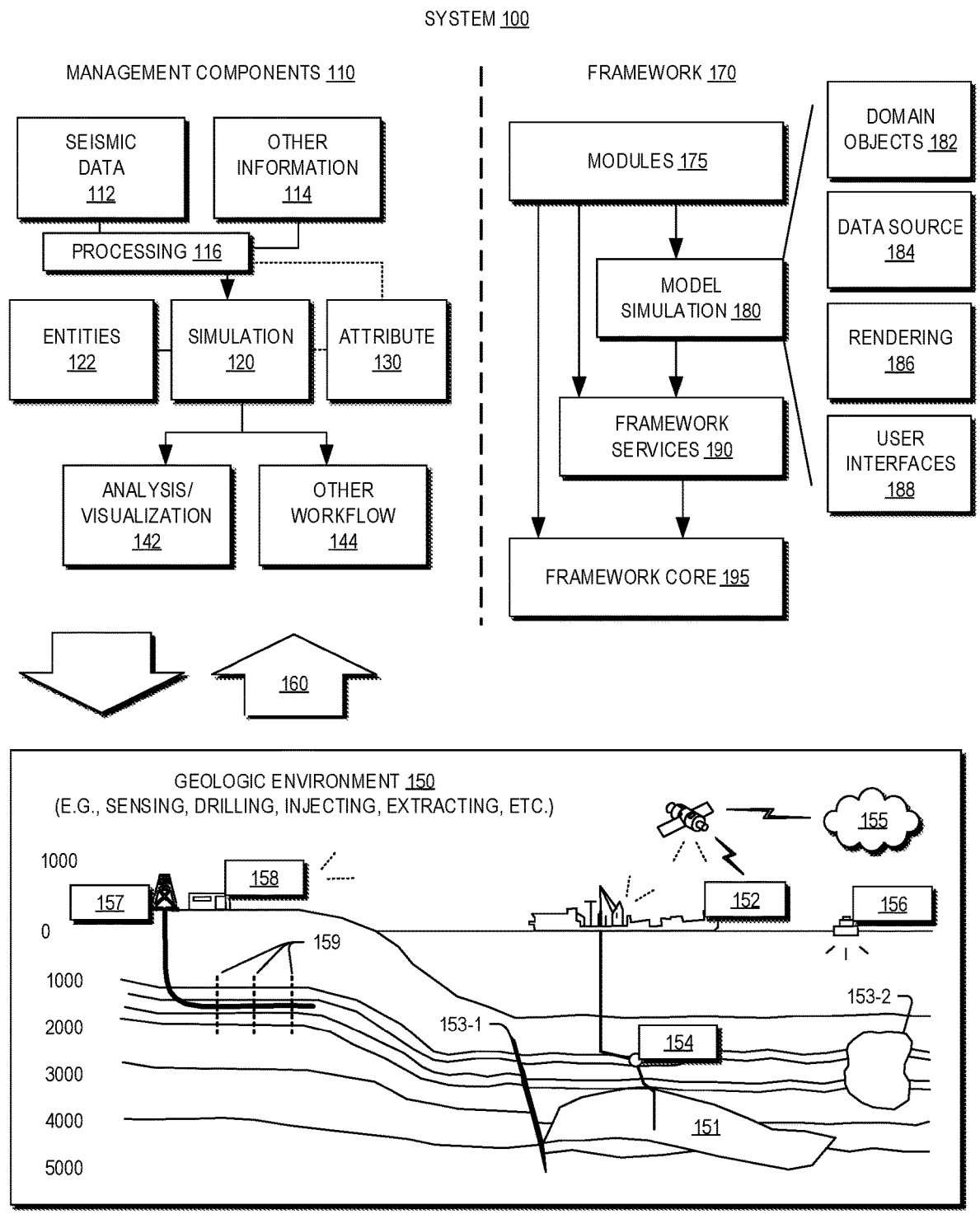
FIG. 1 illustrates an example of a system that includes various management components to manage various aspects of a geologic environment, according to an embodiment.

Embodiments of the present disclosure may provide systems, media, and method for facilitating and increasing efficiency in fault (or other subterranean feature) "extraction from" (e.g., identification in) seismic data. Indeed, embodiments of the present disclosure may make the costly task of manual seismic interpretation more efficient by reducing the time it takes geoscientists to move from a raw seismic cube to an accurately-interpreted seismic cube. Particularly, the present disclosure may make use of machine learning to identify subterranean features, and may provide a simplified graphical depiction of such identified features, facilitating user interaction with a visualization of a processed data set, without having to manually pick out the structures and without having to use a local processor to perform the processing tasks, apart from visualization, in some embodiments.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the . NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2A:
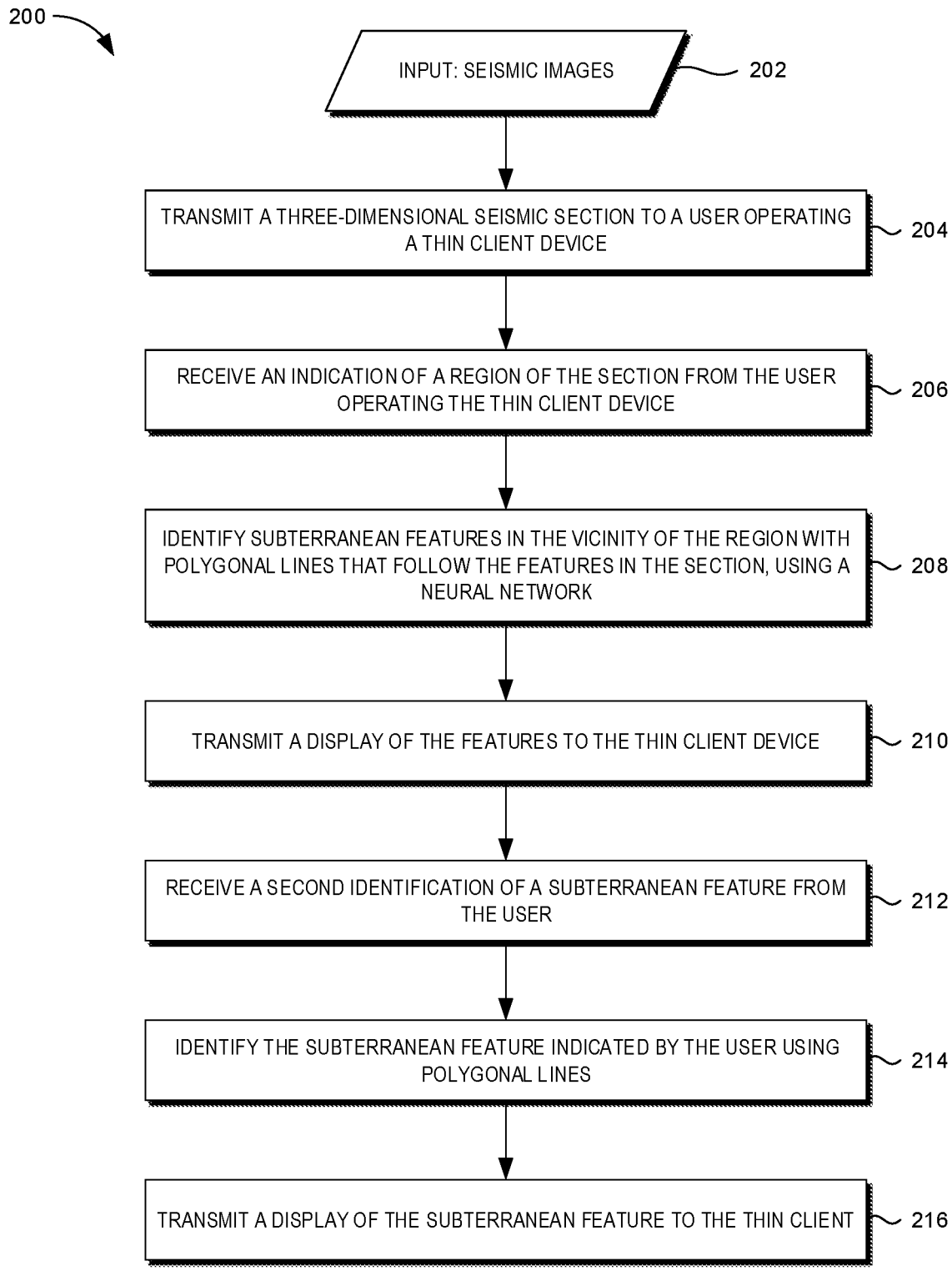
FIG. 2A illustrates a flowchart of a method for automated seismic interpretation, according to an embodiment.
Figure 2B:
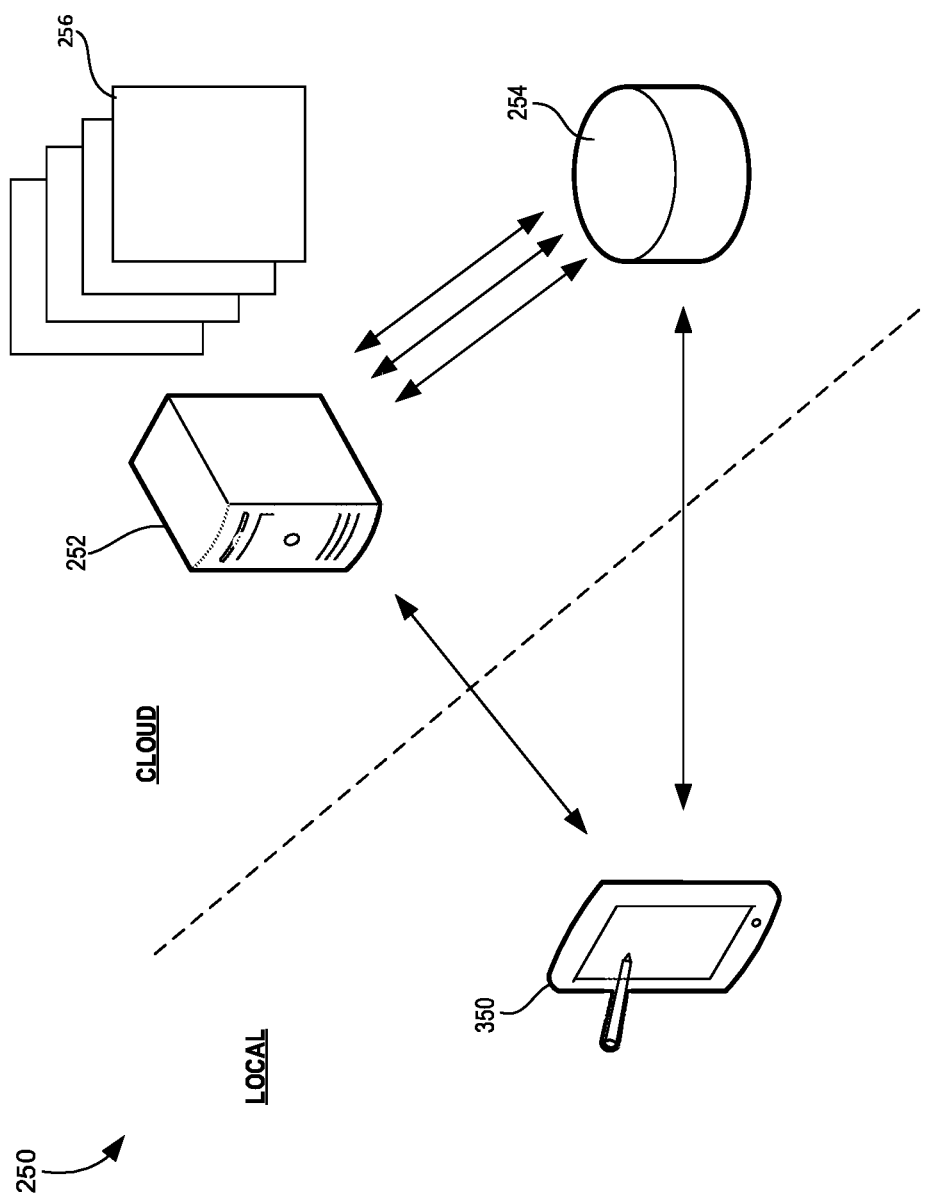
FIG. 2B illustrates a conceptual view of a seismic server system, according to an embodiment.

FIG. 2A illustrates a flowchart of a method for seismic interpretation, according to an embodiment. It will be appreciated that the blocks presented herein may be rearranged, combined, or split without departing from the scope of this disclosure. Further, the method 200 may proceed by operation of a server and/or a thin client device, which may be or include computer processors, as will be described in greater detail below. FIG. 2B illustrates a conceptual view of a seismic server system 250, which may be employed to implement the method 200, according to an embodiment.

At a high level, the seismic server system 250 may include a server 252, a data storage 254, and a thin client device 350. In general, a thin client device may be any type of computer, such as a desktop, laptop, tablet, or smartphone. The thin client device may not be called upon to perform intense processing operations, as these may be performed on a remote server where hardware with greater processing power may be conveniently located. Instead, the thin client device may be fed with visualization data, which it may then display. Further, the thin client device may be capable of sending data back to the server, e.g., user input.

The thin client device 300 may be the "local" side of the system 250, while the server 252 and the data storage 254 may be remote therefrom, e.g., on a "cloud" side of the system 250. It will be appreciated that the local and cloud sides may be remote from one another, and may communicate via the internet or another communications network. Further, the server 252 and the data storage 254 may be maintained at the same location, or may be remote from one another. The seismic server 254 may run one or more instances 256 of the seismic processing platform, and thus certain aspects of the present method 200 may be performed in parallel. Further, the server 252 and the data storage 254 may be in communication with one another via a high-bandwidth, low-latency connection allowing for the execution of multiple threads.

The method 200 may begin with receiving seismic data, such as seismic images, as at 202. The data may be stored in the data storage 254 and accessible to the server 252. Further, these seismic images may be generated from field data that was collected using seismic receivers (geophones, hydrophones, etc.) deployed in a suitable manner in the field, based on seismic waves generated and propagated through a subterranean domain of interest and received by the receivers. The seismic images may be organized in cubes, and may be pre-processed in any manner, e.g., may be stacked, adjusted to account for moveout, etc., and various seismic attributes (e.g., dip) may be applied thereto.

The method 200 may further include transmitting a seismic section to a user operating the thin client device 300, as at 204. The seismic sections may be portions of the seismic data, and may represent a subterranean volume of interest, e.g., for exploration. The seismic sections may be two-dimensional or three-dimensional, and may be viewable by a user using the thin client device 350, once transmitted thereto.

The seismic section transmitted to the thin client device 300 may be selected and transmitted in response to user input/selection. For example, the user may draw a polygonal line on a cross-section of a seismic cube, and a corresponding seismic section may be generated and transmitted to the user for viewing.

Figure 3:
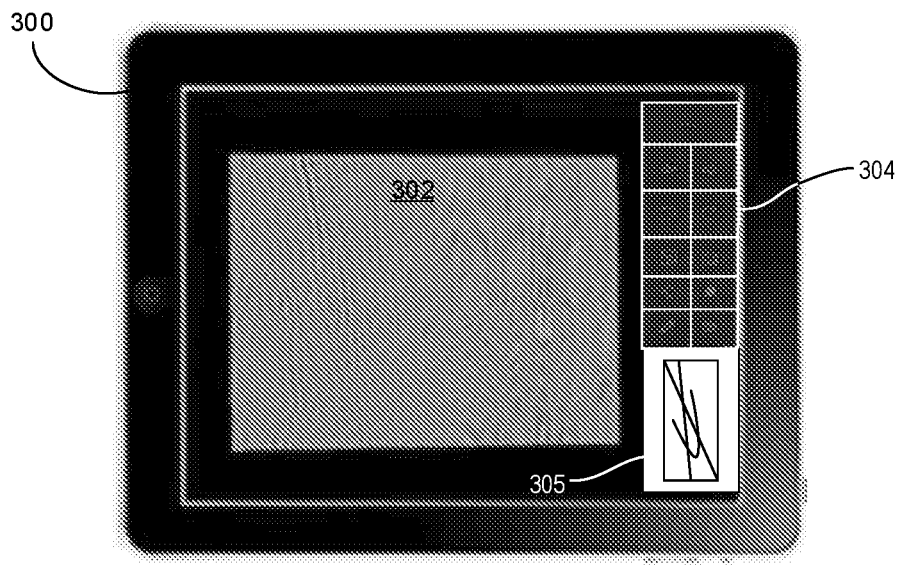
FIG. 3 illustrates a view of a thin client device showing a seismic section image, according to an embodiment.

FIG. 3 illustrates the thin client device 300, according to an embodiment. As shown, the thin client device 300 provides a visualization of a seismic section 302, which may be provided to the user of the thin client device 300 for interpretation. Further, the thin client device 300 may include windows for receiving input. For example, the windows may include a menu 304 and a cross-section view 305. The menu 304 may allow a user to select operations that are available, while the cross-section view 305 may allow a user to select a particular section.

Figure 4:
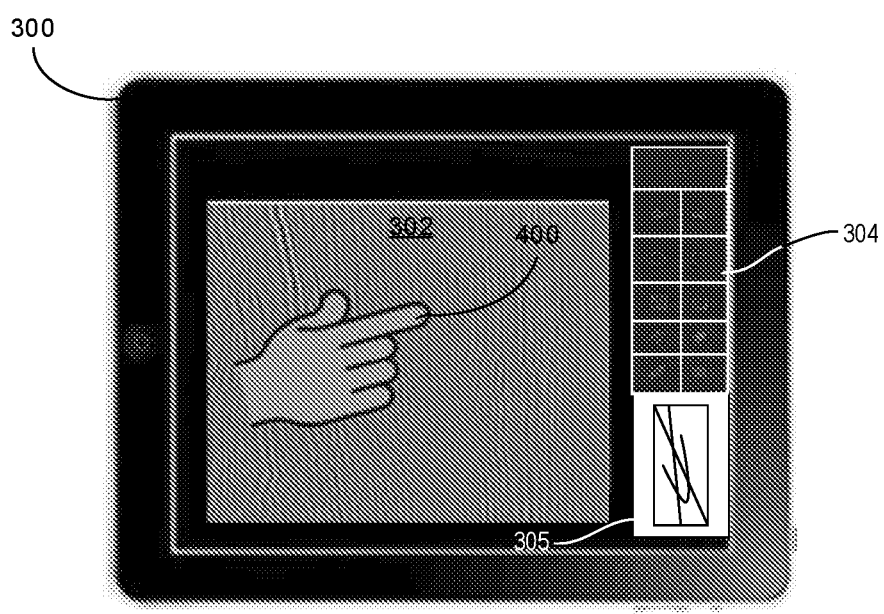
FIG. 4 illustrates a view of a user interaction with the thin client device, according to an embodiment.

Returning again to FIG. 2A, the method 200 may proceed to receiving an indication of a region of the section from the user operating the thin client device 300, as at 206. For example, the user may click a mouse or tap the screen of the device 300, or otherwise indicate a particular region of the visualization. This user-input information may be transmitted back to the server from the thin client device 300. FIG. 4 illustrates an example of a user indicating a region of the seismic section 302 using his/her finger 400.

The method 200 may then proceed to identifying one or more subterranean features in the vicinity of the indicated region using polygonal lines that follow the features in the section, as at 208. This may be accomplished using a neural network, as will be described in greater detail below. The features may be quasi-linear features, which are features that may be accurately approximated using a plurality of line segments joined at vertices to form a polygonal line. Such features may include faults, salt domes, horizons, and/or the like. The features may also be non-quasi-linear, such as disks or other similar shapes, which may also be approximated by a polygonal line (e.g., formed as a polygon). An example of a process not only identifying the features, but then representing them as polygonal lines will be discussed below. In some embodiments, block 208 may be a pre-processing step, and might occur before the other blocks in the method 200. For example, a processor on the server may seek to identify features of a certain type (or potentially all features) in the seismic data that is received. In other embodiments, the identification of the region at 206 may be the trigger that initiates processing, thereby avoiding identifying features in regions that are not of interest to the interpreter.

Figure 5A:
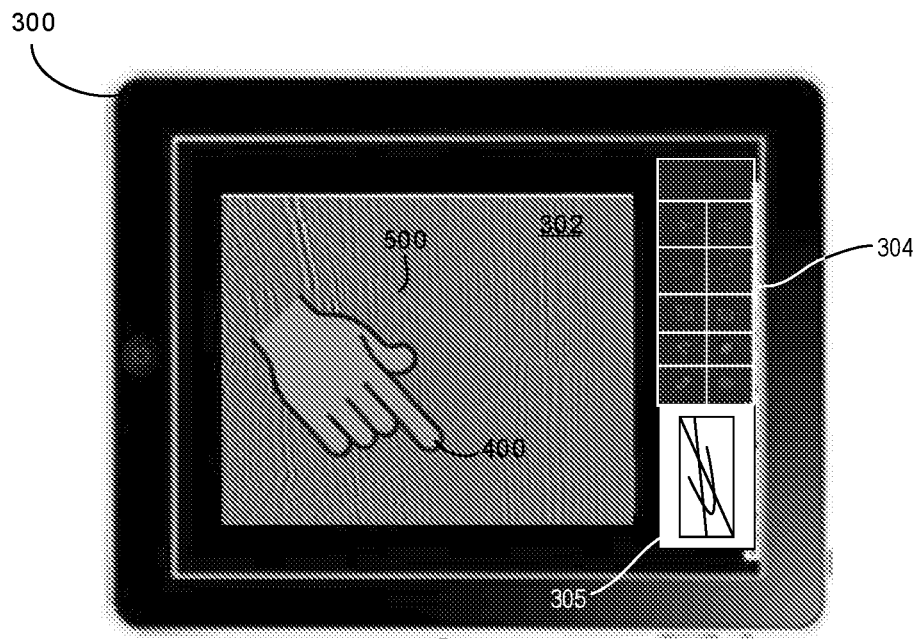
FIG. 5A illustrates a view of the thin client device displaying a quasi-linear feature in the seismic section image to a user, and the user interacting with the display to indicate another potential quasi-linear feature, according to an embodiment.

The method 200 may then transmit a display of the identified features to the thin client device 300, as at 210. FIG. 5A illustrates an example of a quasi-linear feature 500 (e.g., a fault) identified in the section 302, and particularly in the region identified by the user. The transmission may be a separate display, or may provide a line 502 to be overlayed on the visualization of the seismic section 302 that was previously provided to the thin client device 300.

Figure 5B:
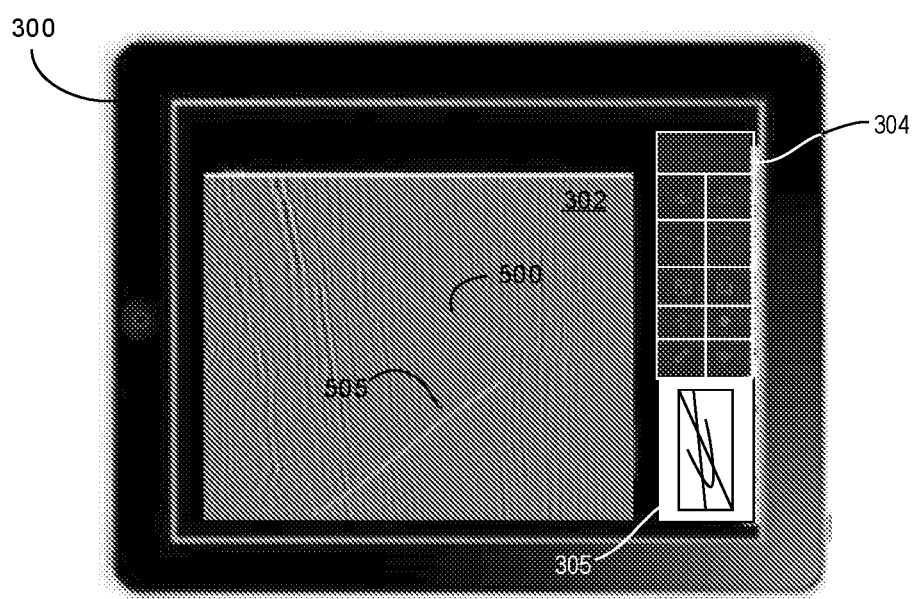
FIG. 5B illustrates a view of the thin client device displaying two quasi-linear features in the seismic section image, according to an embodiment.
Figure 6:
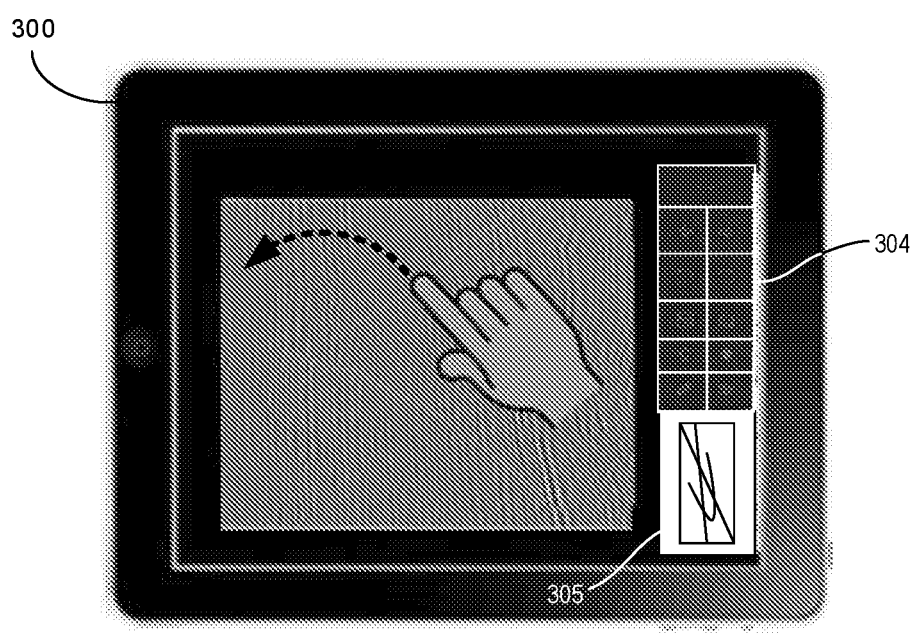
FIG. 6 illustrates a view of the thin client device receiving a gesture (swipe) input from a user, according to an embodiment.

In some cases, the user may believe additional features are present in the region that were not identified by the server. Accordingly, the method 200 may include receiving a second identification, this time of a feature, from the user, as at 212. In particular, as also shown in FIG. 5, the user may tap or click, drag along, or otherwise indicate a position or positions in the section as potentially including another feature, such as a fault, that was not initially identified by the server. The server may then identify the feature indicated by the user, again using polygonal lines, as at 214. The server may then transmit a visualization of the feature 505, again including a polygonal line, if one is found, back to the thin client device 300, as at 216, and shown in FIG. 5B. Additionally, FIG. 6 illustrates a user employing a swiping gesture to advance between seismic sections using the thin client device 300.

Figure 7:
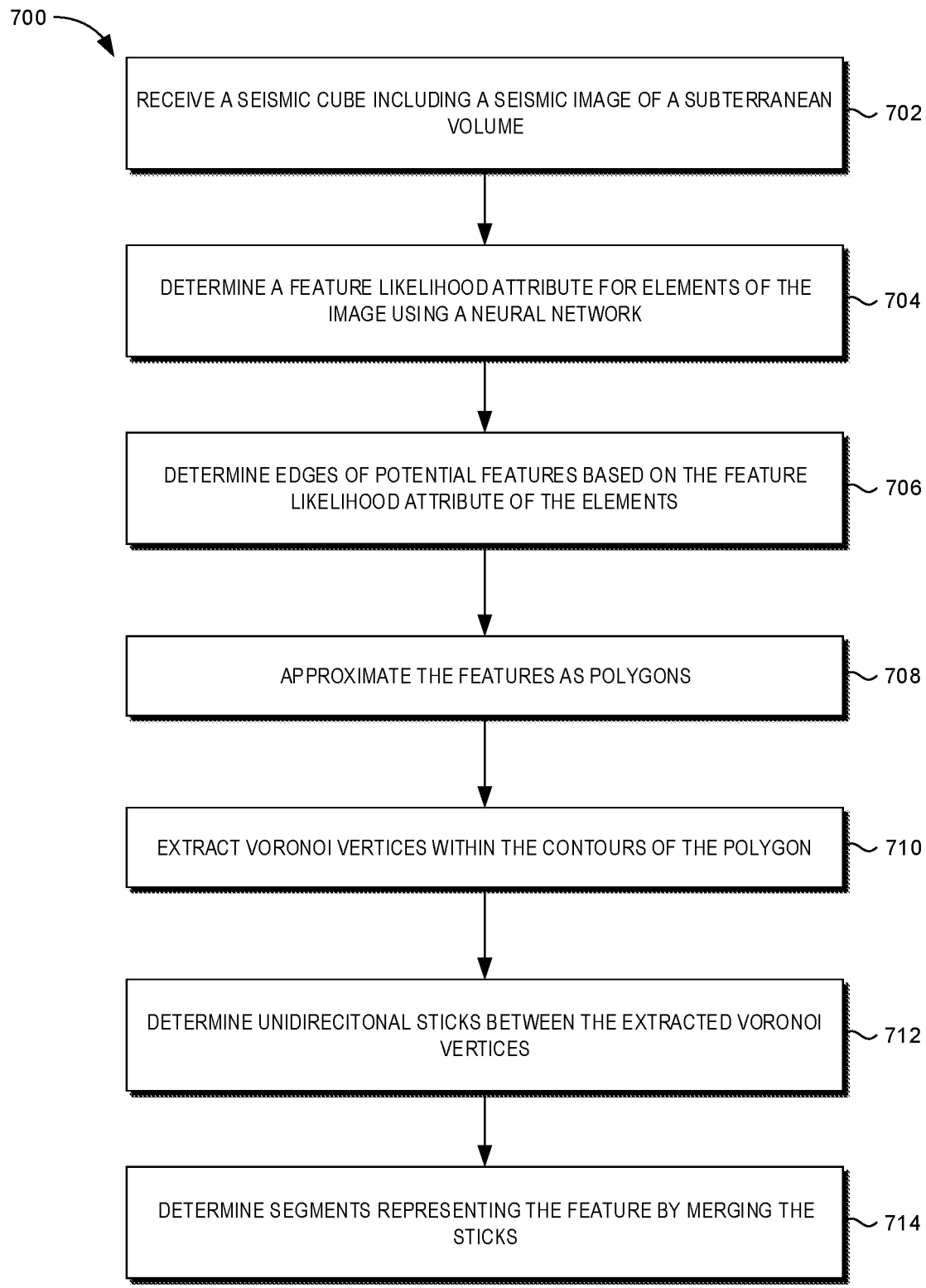
FIG. 7 illustrates a flowchart of a method for automatically identifying quasi-linear features in a seismic image, according to an embodiment.

FIG. 7 illustrates a flowchart of a method 700 for identifying features in a seismic section using polygonal lines, according to an embodiment. At least a portion of the method 700 may be representative of at least a portion of the block 208 of FIG. 2A, but in other embodiments, may be part of a separate method or standalone. Further, the method 700 may proceed by operation of a processor, such as a server, which may be configured to communicate visualization data to, and receive user input from, a thin client device, as mentioned above. It will be appreciated that the blocks presented herein may be rearranged, combined, or split without departing from the scope of this disclosure.

In general, the method 700 takes as input fault (or other quasi-linear or non-quasi-linear feature) attributes in an image format. The method 700 may filter the images in order to detect attribute edges. After approximating the shapes as polygons, it calculates the Voronoi diagrams of each polygon and extracts Voronoi vertices of the image. A medial axis of the shape that corresponds to the output may then be determined, which may be the polygonal line joining some or all of the extracted Voronoi vertices. For difficult cases, such as an attribute with an X shape, the method 700 may include clustering Voronoi vertices in order to distinguish clusters that match lines that are not curved or bent. A simplification can be made to the representation of the detected feature, e.g., to reduce the number of segments in the polygonal line representing the feature.

As used herein, a "fault" is a general object in the seismic cube and, for instance, may define "fault surfaces". At the scale of a section view, a unit of the feature may be a "segment," while the association of multiple "segments" can represent a feature. Further, "sticks" are polygonal lines detected in a section whether there are segments or not, and one, several or many "sticks" can make up a single "segment".

Before continuing with the description of the method 700, a discussion of the theoretical background for several of the elements of the method 700 is instructive. Embodiments of the method 700 may be based on geometrical concepts, such as an Edge Canny Detector. The Edge Canny Detector is an edge detection operator that can be considered as including applying a Gaussian filter, finding intensity gradients of the image, applying non-maximum suppression, applying double threshold to determine potential edges and tracking edges by hysteresis.

Another concept may include K-nearest-neighbor (kNN) classification. For example, the nearest neighbor search may be considered as follows: given a set of points P= $\{p_i\}_{i+1\ldots,n}$ in a vector space X, these points may be preprocessed in such a way that given a new query point q of X, finding the points in P that are nearest to q can be performed efficiently. Here, X will be the Euclidean vector space $R^2$. A KD-tree may be used, which is a space-partitioning data structure for organizing points, e.g., a binary tree in which each node is a two-dimensional point. The classification includes finding the nearest neighbors by comparing the point to each leafs of the tree.

Yet another concept is the Voronoi diagram and medial axis. Let P=$\{p_i\}_{i+1\ldots,n}$ be a finite set of points in $R^d$. The Voronoi diagram associated to P (denoted V(P)) is a cellular decomposition of $R^d$ into d-dimensional convex polytopes called Voronoi cells. There is one cell for each point $p_i$ of P and the Voronoi cell of a point $p_i$, denoted V ($p_i$), is composed of the set of points of $R^d$ closer top, than to any other point in P:

$$V(pi)=\{p \in R^d : \forall j \neq i, \|p-p_i\| \leq \|p-p_j\|\}.$$

Figure 8:
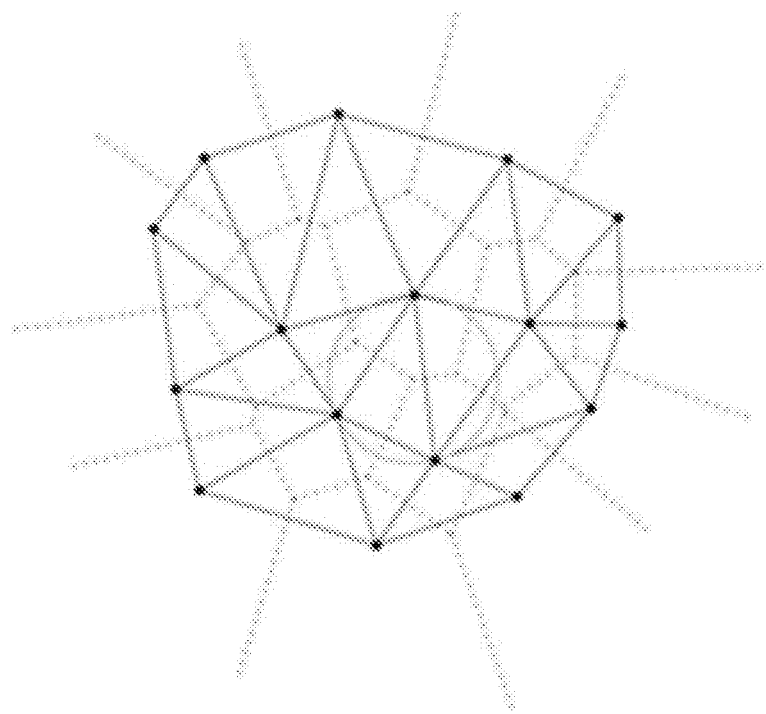
FIG. 8 illustrates an example of a Voronoi diagram, according to an embodiment.

The Voronoi cell V ($p_i$) can also be considered as the intersection of n–1 half-spaces. Each such half-space contains $p_i$ and is bounded by the bisector planes of segments $[p_ip_j]$, j≠i. V (pi) is therefore a convex polytope, possibly unbounded. In two dimensions, the Voronoi edges are the edges shared by two Voronoi cells and Voronoi vertices are the points shared by three or more Voronoi cells. FIG. 8 illustrates a Voronoi diagram of a set of points with a Delaunay triangulation that satisfies an empty circle criteria, according to an embodiment.

Another concept is the Ramer-Douglas-Peucker Algorithm. This algorithm reduces the number of points in a curve that is approximated by a series of points. It draws a line between the first and the last point in the set of points that form the curve. It checks which point in between is the farthest away from this line. If the point is closer than a distance 'epsilon', it removes all these in-between points. If it is not, the curve is split into two parts: (1) from the first point up to and including the outlier point, and (2) the outlier point and the last one. The function is recursively called on both resulting curves and the two reduced forms of the curve are put back together.

Figure 9:
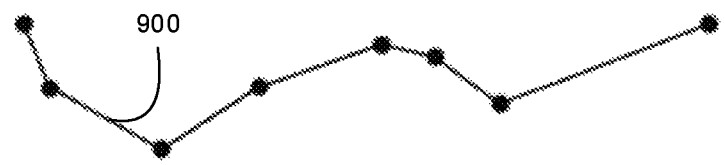
FIG. 9 illustrates a polygonal line segment to be approximated, according to an embodiment.
Figure 10A:
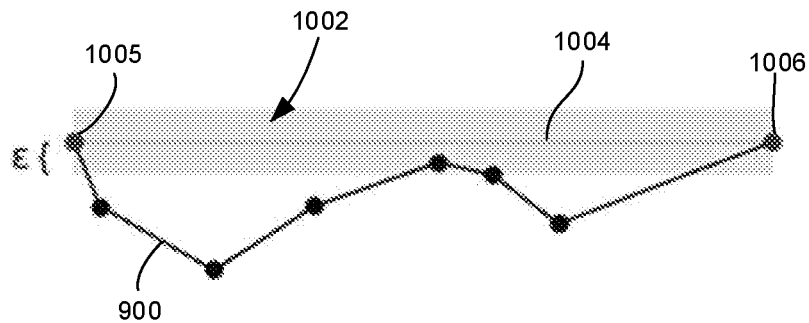
FIGS. 10A, 10B, 10C, and 10D illustrate a process for approximating the polygonal line segment, according to an embodiment.
Figure 10B:
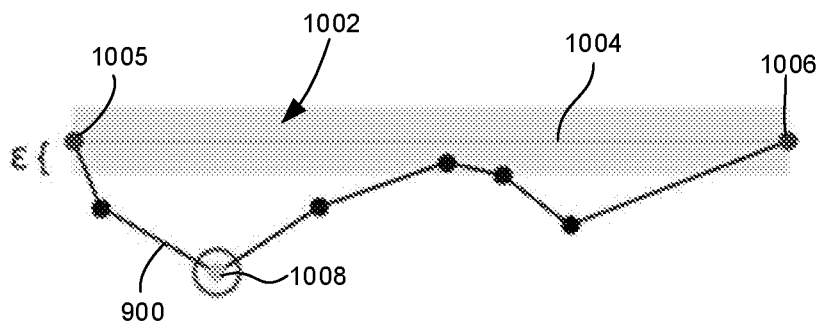
Figure 10C:
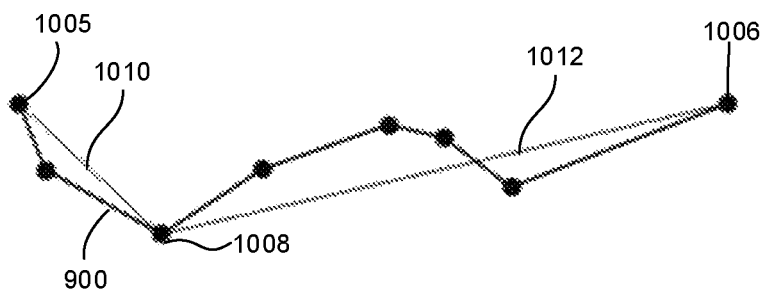
Figure 10D:
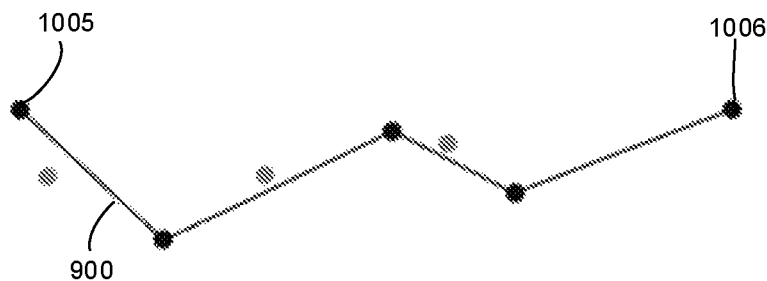

FIG. 9 illustrates a polygonal line 900 to be simplified using, e.g., the Ramer-Douglas-Peucker Algorithm. To do so, as shown in FIG. 10A, an epsilon value is selected, which defines the width of an area 1002 defined about a line 1004 extending between two (e.g., the first and last) points 1005, 1006 of the polygonal line 900. Next, as shown in FIG. 10B, a point 1008 that is farthest from the area 1002 is identified. Now, instead of one line 1004, two lines 1010, 1012 are drawn between the two points 1005, 1006, as shown in FIG. 10C and the point 1008, and the process is repeated for the lines 1010, 1012, e.g., until, as shown in FIG. 10D, the farthest point from the lines drawn is within the epsilon area or according to another stop criteria.

Referring again to FIG. 7, the method 700 may begin by receiving a seismic cube including a seismic image of a subterranean volume, as at 702. The method 700 may then proceed to determining a feature likelihood attribute for elements of the image, as 704. One example seismic (e.g., fault) cube input is based on the output of a machine-learning methods or "deep-learning," which are able to identify faults (or other features) in seismic cubes. The machine-learning algorithm may be trained using a training corpus of seismic images, in which the features may be identified by a human user. The machine-learning algorithm may thus establish connections which enable it to determine the feature-likelihood attribute. The machine-learning algorithm may be trained before the implementation of the method 700 or may be at least partially trained during such implementation, according to feedback from users. For example, upon the user indicating a feature that was not represented as a polygon in the section, the machine-learning algorithm may adjust the feature-likelihood attribute, and, accordingly, may be configured to adjust its future interpretation of seismic cubes accordingly.

Figure 11:
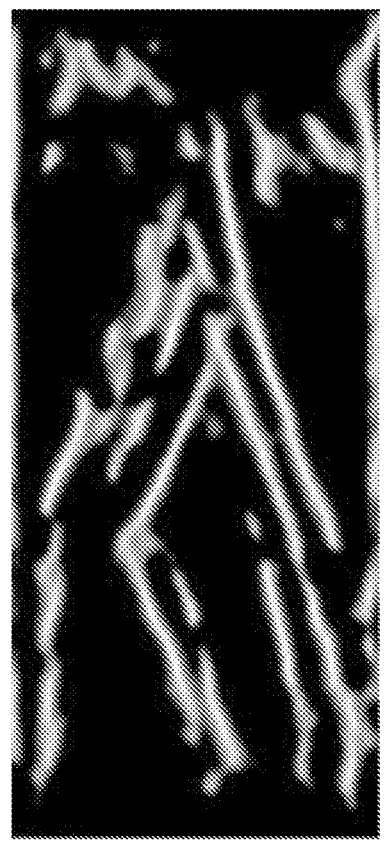
FIG. 11 illustrates a seismic section input, according to an embodiment.

The output of the machine-learning algorithm may be a mask of the elements (pixels or voxels), providing the feature-likelihood attribute, where 1 means 100% sure that the feature is present at this location, and 0 is 100% sure that it is not, with values in between representing the relative certainty. FIG. 11 illustrates these values, with lighter areas indicate a higher probability of feature, in this case a fault, presence. However, feature such as faults may not be expected to be as wide as those shown. In one approach, a thinned feature-likelihood attribute image may be generated. Moreover, the shape describing where the fault might be as output of the machine-learning method, may be an artifact of the deep learning model. Indeed, during the learning phase, attributes may be widened because the model may not be capable of being trained on lines.

The method 700 may thus proceed to determining edges of potential features based on the feature-likelihood attribute, as at 706. A preliminary step in order to remove edge effects of the image may be performed. Attributes residing at the edges of the image may be truncated by the edges of the section, and thus may not be considered as convex. To simplify the process and consider convex attributes, the image may be "padded" with elements that are black (0 value). As a result, elements (pixels or voxels) on the edges of the image may not be considered as part of an attribute, and the shapes may be considered as convex. The coordinate system may not be changed and may still employ the original image properties.

A series of image treatments may be applied in order to facilitate extraction of the contours of the features. First, a smoothing process may be applied in order to reduce noise of the input image. Gaussian blurring or bilateral filtering are two examples of such a smoothing process. Next, the image, which is in gray level, may be reduced to a binary image, e.g., using Otsu's method, for example.

An Edge Detector, such as Canny, may then be applied to detect the contours in the image. The output is then a binary array with dimensions equal to the height and the width of the image, filled with binary values where 1 means that the pixel is part of the feature edges and 0 means it is not.

Figure 12A:
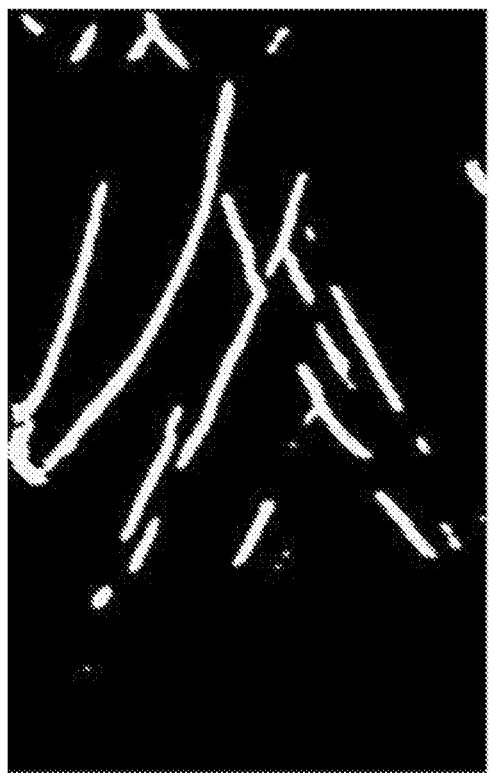
FIG. 12A illustrates a feature-likelihood attribute of the seismic cube, according to an embodiment.
Figure 12B:
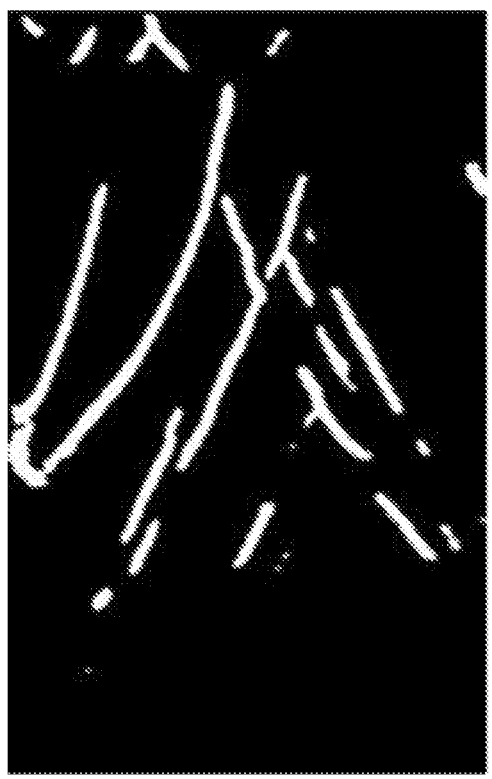
FIG. 12B illustrates the feature-likelihood attribute after a filtering operation, according to an embodiment.
Figure 12C:
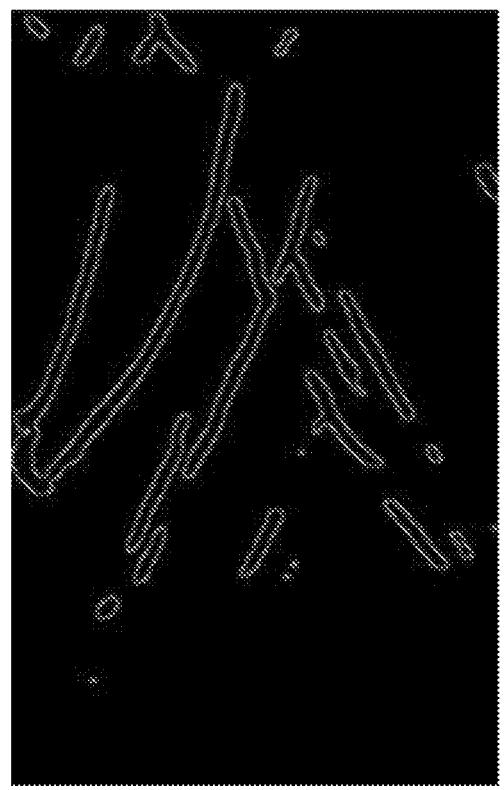
FIG. 12C illustrates the feature-likelihood attribute after filtering and edge detection, according to an embodiment.

FIG. 12A illustrates the feature likelihood attribute applied to the seismic section of FIG. 11. FIG. 12B illustrates the image after Gaussian filtering, and FIG. 12C illustrate the image after edge detecting.

Figure 13:
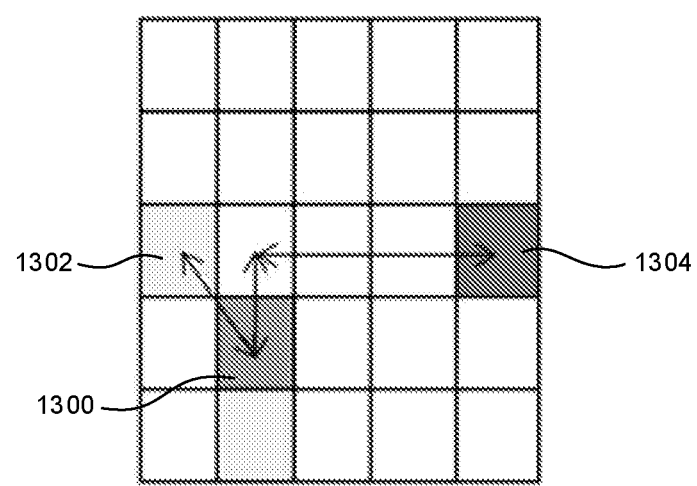
FIG. 13 illustrates a conceptual view of a nearest neighbor and minimal distance calculation, according to an embodiment.

Next, the coordinates of the pixels that are part of the feature edges are extracted. To do so, the pixels may first be ordered, e.g., as part of a clustering process, which may include finding the nearest neighbors of each pixel or voxel. A K-nearest-neighbors with KD-tree process may be employed, which clusters the point coordinates by contours and orders them in the clockwise order, to name one specific example. FIG. 13 illustrates an example of finding the nearest neighbors to a pixel 1300. In particular, the pixel 1302 is likely to be considered the nearest neighbor, while the pixel 1304 may not be too far away from the pixel 1300 and may thus be part of another contour.

In a specific embodiment, the first rank of the list is given to the edge pixel that is closest to the bottom of the image. The method then searches for the first edge pixel's nearest neighbors (e.g., at most two nearest neighbors), and assigns to the one clockwise the second rank. It then again searches for the nearest neighbor, but this time, there may be only one. When the distance between each neighbor is larger than a predetermined maximum distance (e.g., square root of 10 pixels), a new list may be created, which demonstrates that it is a new contour. When one of the image's edges is reached, the algorithm follows its process by doing a K-nearest-neighbor search back from the beginning of the current list but in the counter-clockwise order.

The output is a list wrapping tuples of an integer and a list of points (each point defined by a couple of integers). Each low-level list describes one single contour. The contours are ordered by one of the axis. The integers, linked to the lists of point coordinates, correspond to the rank of the contour in question in the section. The length of the top-level list corresponds to the number of contours detected. Before extracting medial axis from these attributes, ones that are not convex may be considered as artifacts and may be removed.

With the edges identified, the method 700 may proceed to approximating the features as polygons (e.g., using three or more polygonal lines), as at 708, and extracting Voronoi vertices within the contours of the polygons, as at 710. The original image can be split up in layers in which there is a single contour. The method 700 may then approximate the shape defined by the contours as a polygon, in order to draw the Voronoi diagram. For that, the aim is to create a sample of equidistant points of the list of the contour's edges' coordinates. The distance between two polygon edges may be maintained large enough to have a coherent medial axis, while not being too long so as to deteriorate performance. One of ordinary skill in the art will be able to determine such a tradeoff. In order to have a sample of points, a scanline or similar algorithm can be used, for example. The Voronoi vertices obtained with this algorithm may be aligned closer to the medial axis than some other algorithms, but any suitable method may be employed. The Voronoi diagram may then be calculated, as discussed above. The coordinates of the Voronoi vertices inside the polygons may be employed to approximate the attribute's edges.

Figure 14A:
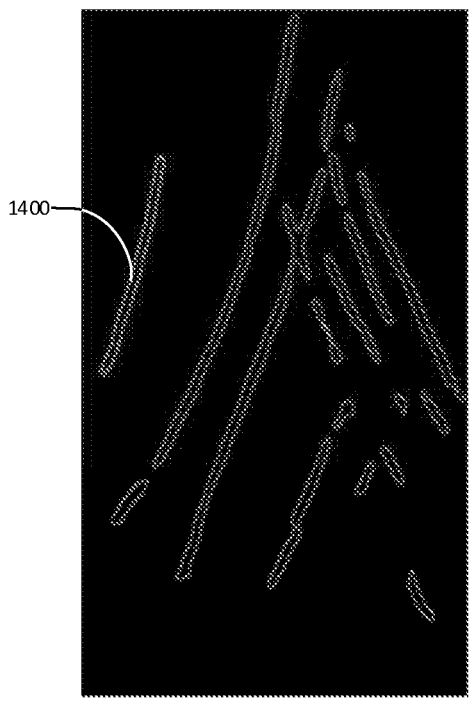
FIG. 14A illustrates an edge determination of the contours of the feature-likelihood attribute, according to an embodiment.

FIG. 14A illustrates an edges sample of a contour 1400, according to an embodiment.

Figure 15A:
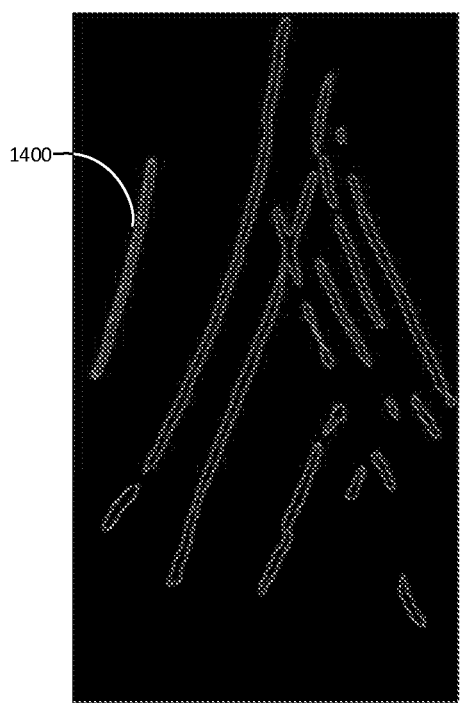
FIG. 15A illustrates edges with Voronoi vertices of the feature-likelihood attribute, according to an embodiment.
Figure 14B:
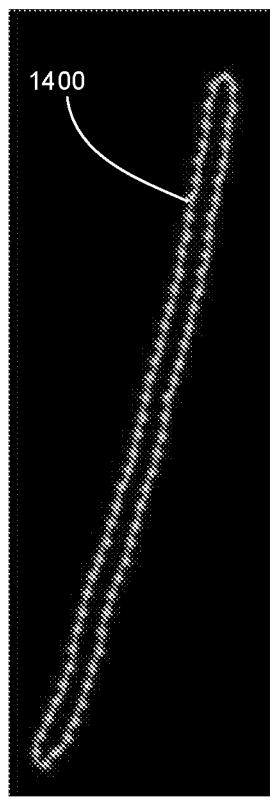
FIG. 14B illustrates an enlarged view of a portion of FIG. 14A, according to an embodiment.
Figure 15B:
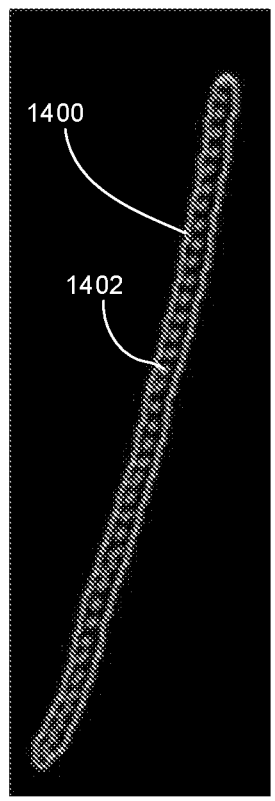
FIG. 15B illustrates an enlarged view of a portion of FIG. 15A, according to an embodiment.

FIG. 15A illustrates the contour 1400 with Voronoi vertices within the edges indicated, according to an embodiment. FIG. 14B illustrates an enlarged view of the contour 1400, and FIG. 15B illustrated an enlarged view of the contour 1400 with the Voronoi vertices 1402 indicated.

Next, the method 700 may proceed to determining unidirectional sticks between the extracted Voronoi vertices, as at 712. The term "direction" refers to the direction in the image in which the stick points, e.g., top right, top left, bottom right, bottom left, etc. Thus, unidirectional sticks include lines that point in a single direction.

In an embodiment, the method 700 may detect faults (or other features) as polygonal lines. In particular, embodiments may result in lines that follow along, to the extent possible, discernible features in the seismic cube. In some instances, the machine learning programs can have outcomes that are more complex than lines, for example, when two different attributes cross each other, or two curved attributes meet at one of their extremities. The method 700 may thus be configured to handle these type of shapes. In order to do this, the method 700 may include splitting some the "sticks" (segments between two Voronoi vertices) into a list of smaller sticks which are unidirectional (i.e., not curved or bent). The polygonal lines may thus be determined by juxtaposing aligned sticks which have approximately the same direction in the plane.

For example, the short sticks extracted from the Voronoi vertices may be merged with the sticks that that belong to the same segment. These may be referred to as "unit sticks". The method 700 may ensure the unit sticks are unidirectional. In order to extract the unit sticks, a list of points is created that matches to a "unit stick". The list of points may be built using one or more criteria. From the list of points to be considered, a linear regression is performed, and then a correlation factor is employed, set to a predetermined limit. If the points are sufficiently close together, as compared to the scale of the image, the correlation factor might be less than the value set as a limit. These points may be considered to match to a unit stick if the maximal distance to the regression line is shorter than a previously defined distance. This distance can be added as a parameter of the criteria. Once multiple sets of points have been considered, a list of sticks is created.

From the list of sticks obtained from the extraction of the Voronoi vertices, each stick is considered separately and evaluated using the criteria. When a stick is judged as meeting the criteria, it is identified and set aside. A series of such determines proceeds, until the sticks satisfy the criterion.

Manual clustering may be used to define the unit sticks. For example, the sticks may be split where the edges of two or more contours cross. Specifically, for the segments of the list of sticks that links two adjacent Voronoi vertices, the method 700 may include checking the segments to determine if they intersect one of the contour's edges. If as segment does intersect an edge (being tangent may not be considered as crossing the edges), the list defining the segment may be partitioned into two child lists, which are split where the intersection occurs. This splitting may only be called for one time, as the child lists theoretically may not cross contour edges after such splitting.

In addition, clustering on angles may be employed. Clustering on angles considers the angles between the segments joining two adjacent Voronoi vertices and one of the axis, and splitting where there is a sufficiently large change in amplitude. For example, clustering on angles may include computing angles between each segment that links two adjacent Voronoi vertices of the stick and one of the axis. Due to the nature of the Delaunay triangles, the juxtaposition of the Voronoi vertices may appear like a zig-zag. So to analyze the general direction of the stick, the mean value may be employed. To find the sufficiently large changes in amplitude, a discrete derivative may be calculated. Then, the Ramer-Douglas-Peucker algorithm, discussed above, may be applied in order to extract the absolute value of the peaks of the derivative. Finally, the list may be partitioned into two "child" lists and split where the amplitude peak is found. This process may be repeated until the child-sticks each satisfy the criterion, or there are no more peaks in the derivatives of the angles. Next, the method 700 may include removing the small sticks. The clustering may also be configured to overlook the lists of points with two points or less.

Figure 16A:
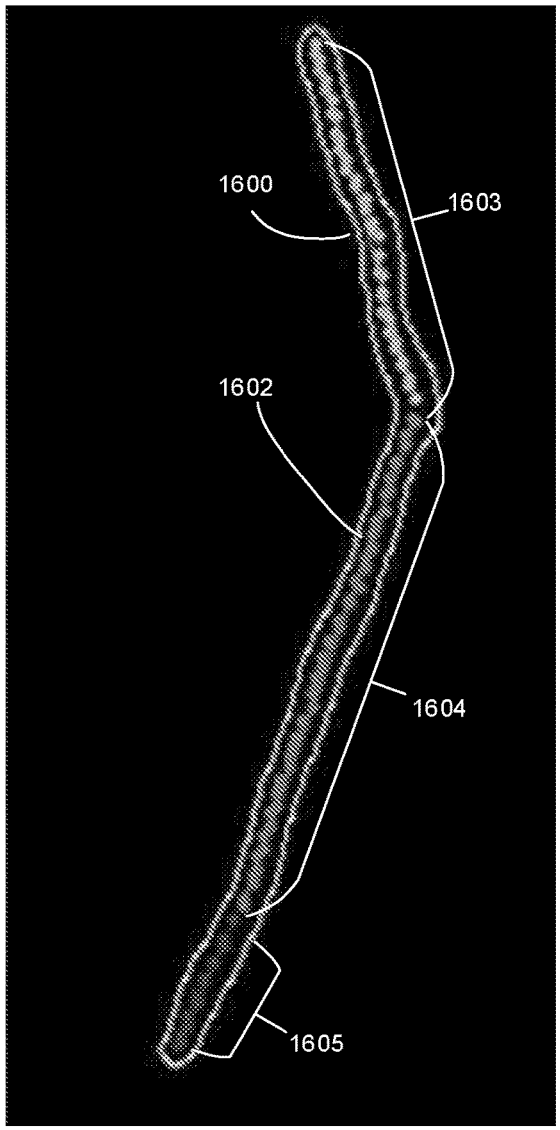
FIG. 16A illustrates a view of the Voronoi vertices of FIG. 16A after clustering, according to an embodiment.
Figure 16B:
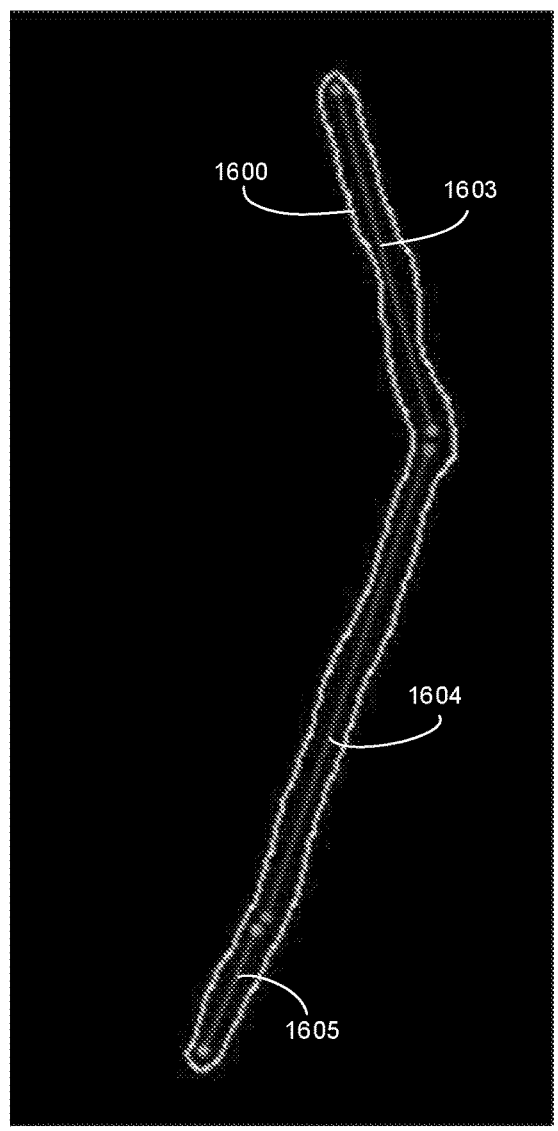
FIG. 16B illustrates a view of sticks representing the contour after clustering and simplification of the Voronoi vertices.

FIG. 16A illustrate a series of Voronoi vertices 1600 defined in a feature 1602, according to an embodiment. The vertices 1600 may be clustered and split using a clustering on angles process, as described herein. In particular, the vertices 1600 are partitioned into three sets of vertices 1603, 1604, 1605, based on angles therebetween. As shown in FIG. 16B, the sets 1603-1605 may be linked together and simplified, as discussed herein.

Next, the segments from which the polygonal lines are determined may be defined by merging the sticks, as at 714. In some embodiments, the "unit sticks" are merged into polygonal lines with a minimum number of points. A simplification algorithm may be applied on the single sticks, i.e., the output of the previous worksteps. For instance, the Ramer-Douglas-Peucker Algorithm with a predetermined epsilon value can be employed. With the "unit sticks" of the section defined, the polygonal lines (segments) may then be defined therefrom.

To determine which sticks should be merged together, a list of criteria may be employed. For example, one stick and one candidate for merger therewith into the same segment may be considered. If the highest-ordered point of the stick is aligned with the points of the candidate stick, and their directions are the same, then the method 700 may determine that the stick and the candidate belong to the same segment.

Figure 17:
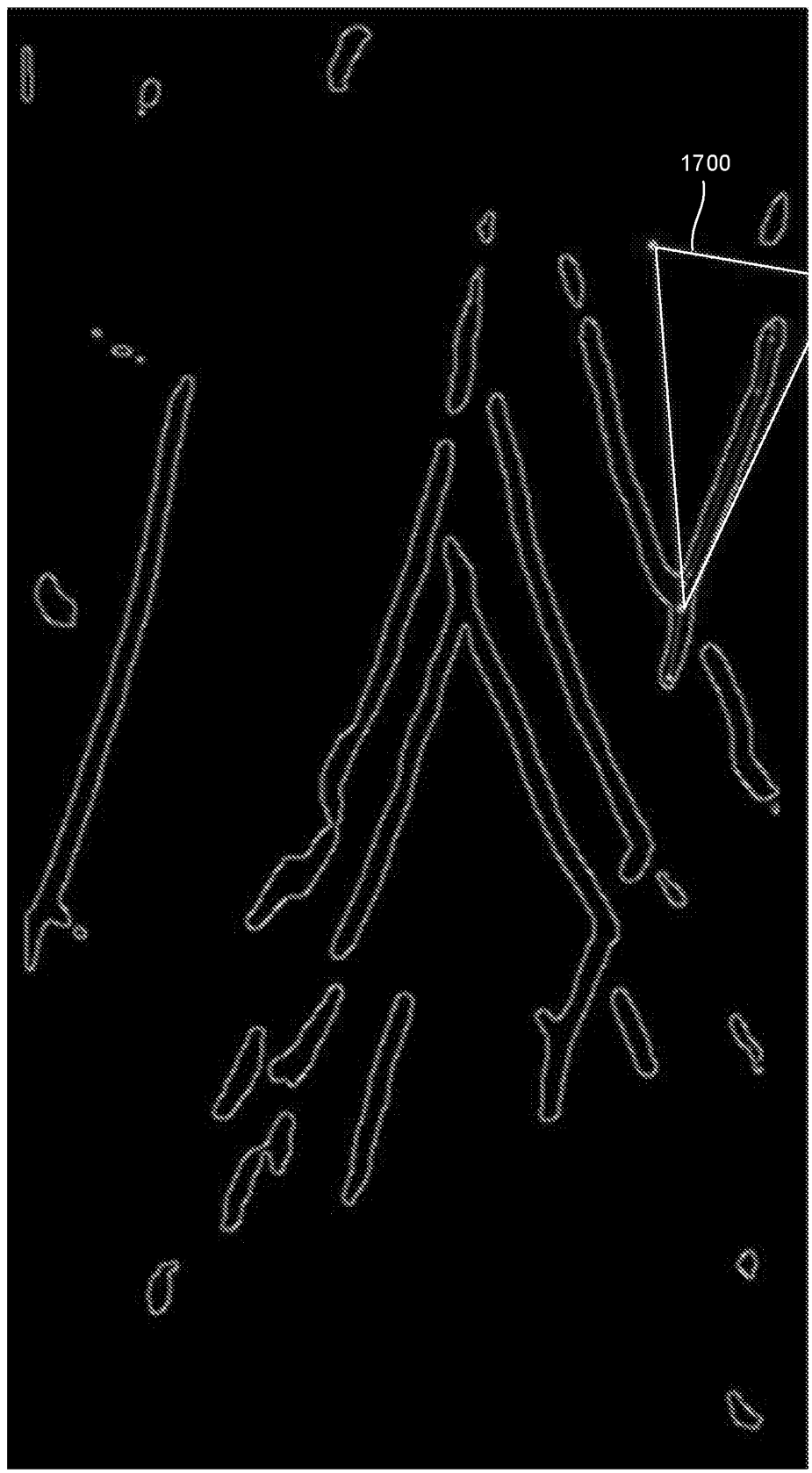
FIG. 17 illustrates a view of a triangular nearest-neighbor search using the simplified Voronoi vertices in order to find unidirectional sticks, according to an embodiment.

Accordingly, the method 700 may proceed by beginning from the lowest-ordered stick in the image (the "object" stick), and the method 700 may search for sticks nearby the object stick. The search area defining what is "nearby" can be for example a triangle having one of the vertices as the highest-ordered point of the stick, with the "direction" of the triangle 1700 the same as the stick, as shown in FIG. 17. The triangle 1700 may have a predefined area and/or dimension.

Figure 18:
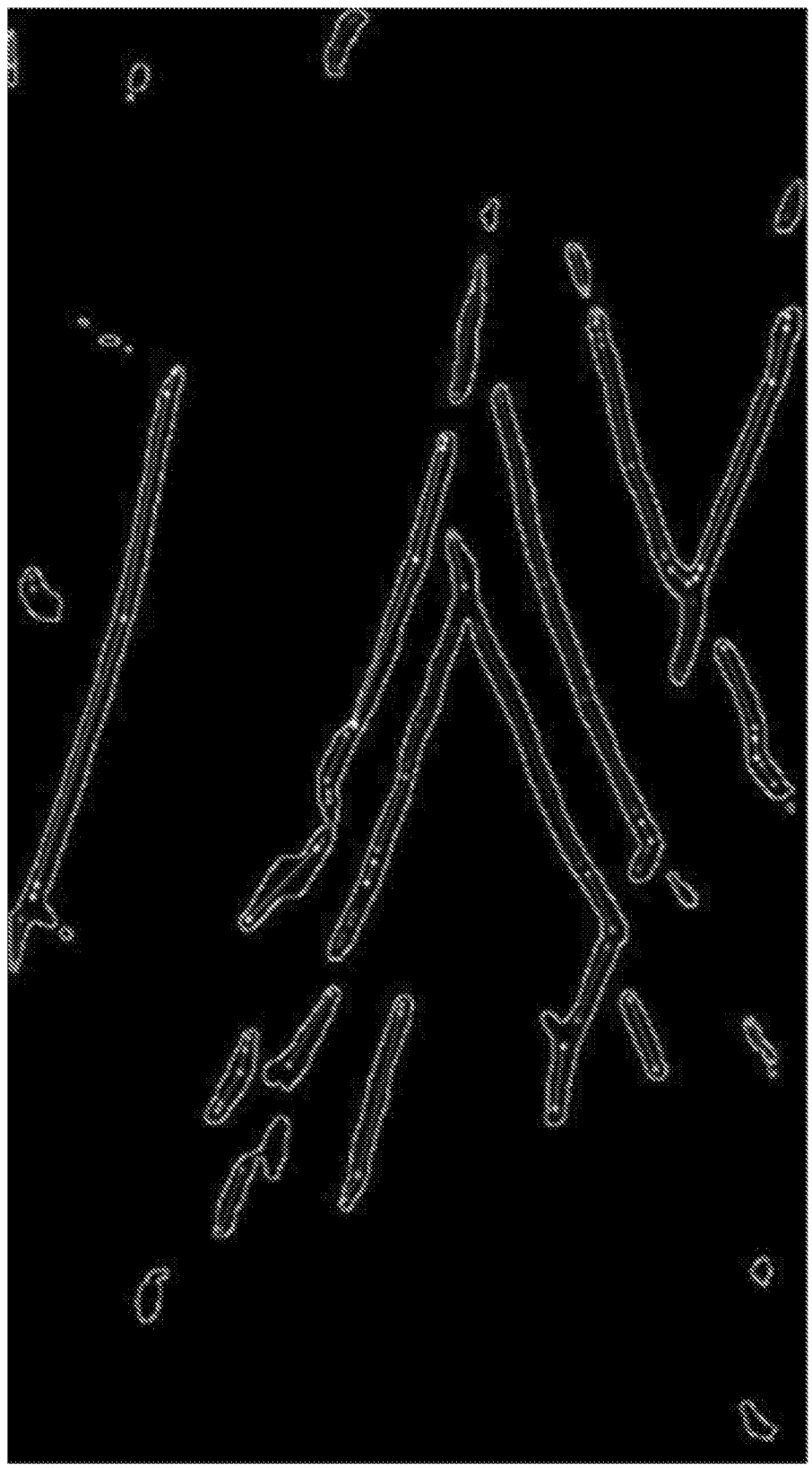
FIG. 18 illustrates a result with the segments indicating the different features, according to an embodiment.

From the sticks that do not belong to segments, the sticks that have their lowest-ordered point in the area are kept. The sticks kept are then ordered from the closest to the object stick to the farthest therefrom. Next, the criterion is applied with the first candidate stick. If it satisfies the criterion, the sticks are merged, and become the object stick. Otherwise, the object stick is compared to the next candidate stick in the list. This process can be repeated until a next stick is not found, which may indicate that all sticks that are part of the segment have been found and merged. Thus, the method 700 may proceed to merging sticks for the next segment. FIG. 18 illustrates a result of this method, with the segments indicating the different features, with a minimum of complexity (e.g., fewest vertices while still staying within the contours), as shown.

The methods presented above are based on computational geometry and aim to extract faults or other seismic patterns like salt bodies. The methods increase process efficiency by saving the user's time as part of an ordered combination of worksteps. Instead of spending many seconds on each single segment per section, the user can extract the fault, with this method and only with one mouse click, capitalizing on a trained neural-networks' ability to determine the feature-likelihood attribute. Further, with, e.g., one mouse click, multiple seismic sections segments may be extracted from the same feature, or within a section, the faults with the same inclination (or another attribute) may be selected.

Figure 19:
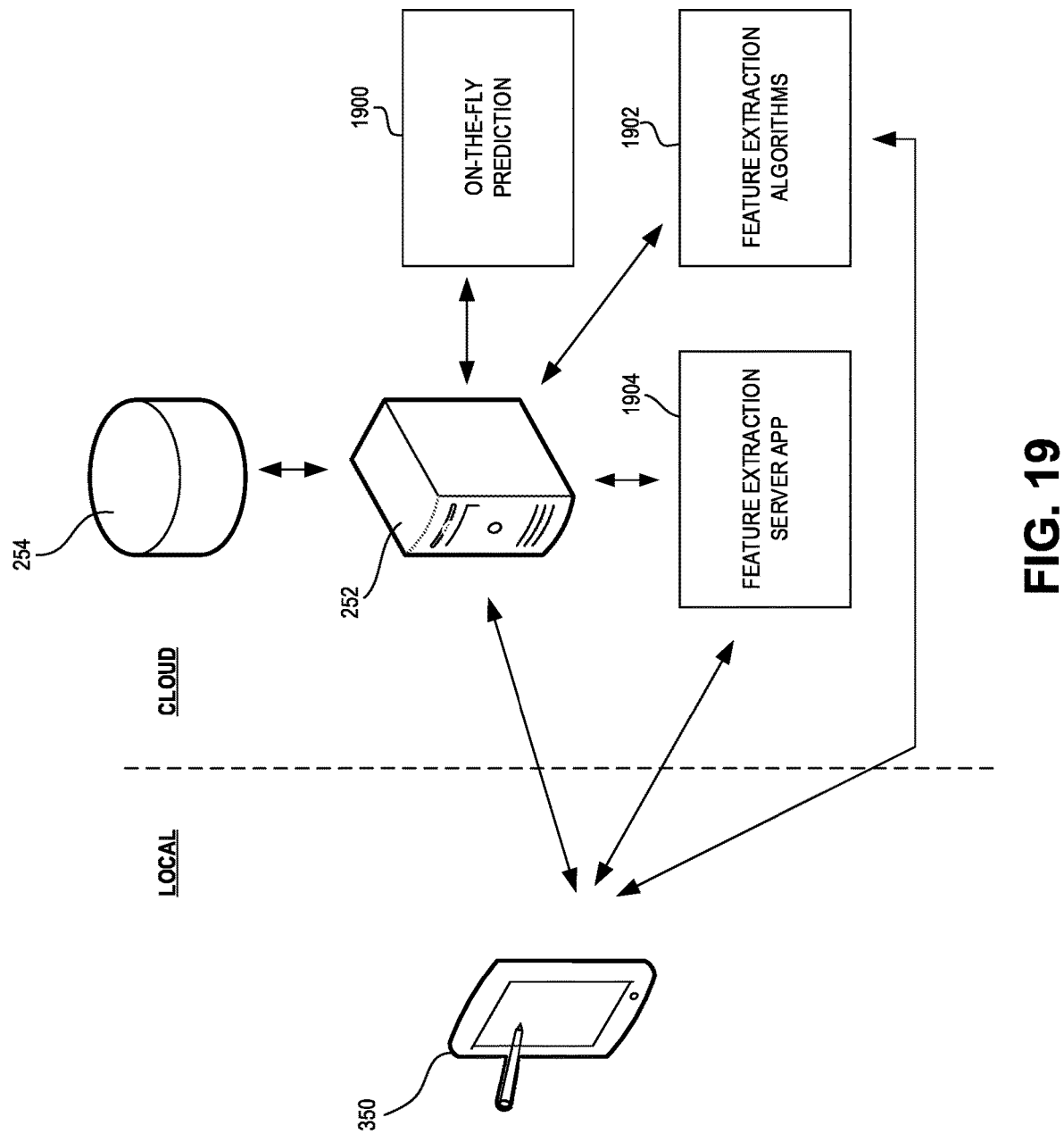
FIG. 19 illustrates a conceptual view of the seismic server system executing operations of the present disclosure, according to an embodiment.

FIG. 19 illustrates a conceptual view of the seismic server system 250 performing at least some of the functions of the method described above, according to an embodiment. As shown, the thin client device 300 may communicate with the server 252 and/or the data storage 254. Further, the server 252 may be configured to perform various tasks. For example, the server 252 may execute on-the-fly prediction of subterranean features, as at 1900. This may be proxied by the seismic server and thus may not need to access data. The server 252 may also execute feature extraction algorithms, as at 1902 and e.g., as discussed above with respect to FIG. 7 to generate the feature likelihood attribute. The server 252 may further execute a feature extraction server application, as at 1904. This may support the operation of the thin client device 300. For example, the server-side scripts may execute as part of this application, and static webpages and scripts may execute in the browser may be generated and/or hosted using this application.

Figure 20:
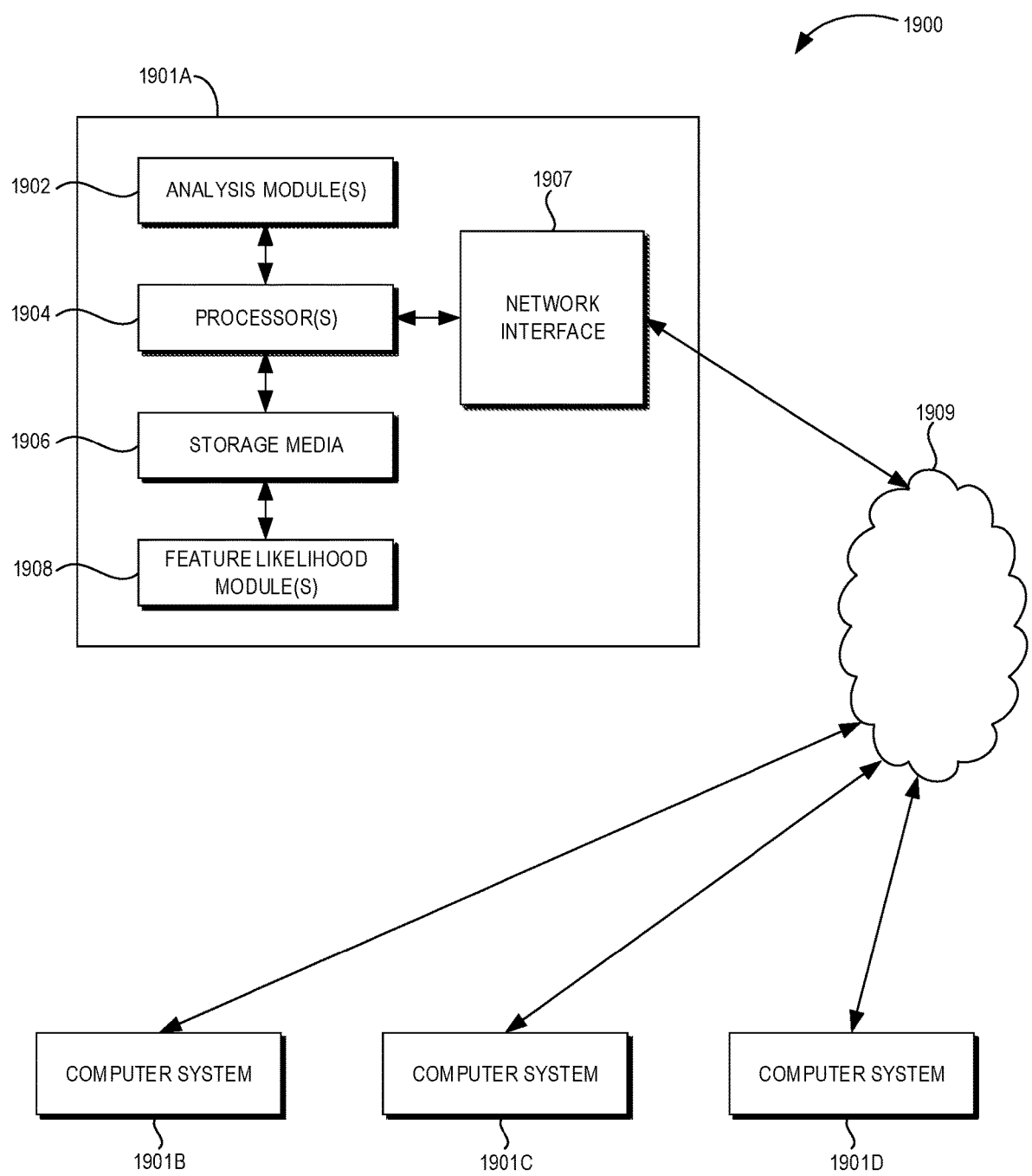
FIG. 20 illustrates a schematic view of a computing system, according to an embodiment.

In some embodiments, the methods of the present disclosure may be executed by a computing system. FIG. 20 illustrates an example of such a computing system 2000, in accordance with some embodiments. The computing system 2000 may include a computer or computer system 2001A, which may be an individual computer system 2001A or an arrangement of distributed computer systems. The computer system 2001A includes one or more analysis modules 2002 that are configured to perform various tasks according to some embodiments, such as one or more methods disclosed herein. To perform these various tasks, the analysis module 2002 executes independently, or in coordination with, one or more processors 2004, which is (or are) connected to one or more storage media 2006. The processor(s) 2004 is (or are) also connected to a network interface 2007 to allow the computer system 2001A to communicate over a data network 2009 with one or more additional computer systems and/or computing systems, such as 2001B, 2001C, and/or 2001D (note that computer systems 2001B, 2001C and/or 2001D may or may not share the same architecture as computer system 2001A, and may be located in different physical locations, e.g., computer systems 2001A and 2001B may be located in a processing facility, while in communication with one or more computer systems such as 2001C and/or 2001D that are located in one or more data centers, and/or located in varying countries on different continents).

A processor may include a microprocessor, microcontroller, processor module or subsystem, programmable integrated circuit, programmable gate array, or another control or computing device.

The storage media 2006 may be implemented as one or more computer-readable or machine-readable storage media. Note that while in the example embodiment of FIG. 20 storage media 2006 is depicted as within computer system 2001A, in some embodiments, storage media 2006 may be distributed within and/or across multiple internal and/or external enclosures of computing system 2001A and/or additional computing systems. Storage media 2006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 2000 contains one or more feature likelihood module(s) 2008. In the example of computing system 2000, computer system 2001A includes the feature likelihood module 2008. In some embodiments, a single feature likelihood module may be used to perform some aspects of one or more embodiments of the methods disclosed herein. In other embodiments, a plurality of feature likelihood modules may be used to perform some aspects of methods herein.

It should be appreciated that computing system 2000 is merely one example of a computing system, and that computing system 2000 may have more or fewer components than shown, may combine additional components not depicted in the example embodiment of FIG. 20, and/or computing system 2000 may have a different configuration or arrangement of the components depicted in FIG. 20. The various components shown in FIG. 20 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 2000, FIG. 20), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for interpreting seismic data, comprising:
receiving seismic data representing a subterranean volume, at a server system;
transmitting a section of the seismic data to a thin client device;
determining, using the server system, a feature-likelihood attribute of at least a portion of a section of the seismic data, wherein the feature-likelihood attribute comprises values for elements of the section, the values being based on a likelihood that the individual elements represent part of a subterranean feature;
receiving an indication of an area in the section that includes a subterranean feature from the thin client device;
adjusting the feature-likelihood attribute, using the server system, for the indicated area in response to the area being indicated;
identifying, using the server system, contours of the subterranean feature in the area indicated based in part on the feature-likelihood attribute of the indicated area of the section wherein identifying comprises approximating the subsurface feature as a polygon;
determining, using the server system, a polygonal line that approximates the subterranean feature in the area indicated, wherein determining the polygonal line includes extracting vertices of the polygon; and
transmitting data representing the subterranean feature in the section, based at least in part on the polygonal line, from the server system to the thin client device, wherein the thin client device causes a visualization of the section, including a representation of the subterranean feature in the section of the seismic data, to be displayed to a user.

2. The method of claim 1, wherein determining the feature-likelihood attribute comprises processing the section using a neural network to determine the values for the elements.

3. The method of claim 1, further comprising applying a filter to the seismic data prior to identifying the contours.

4. The method of claim 1, wherein determining the polygonal line comprises:
identifying edges of the subterranean feature;
generating a Voronoi diagram of the edges to determine Voronoi vertices representing the subterranean feature; and
connecting at least a portion of the Voronoi vertices to form the polygonal line.

5. The method of claim 4, wherein connecting the at least a portion of the Voronoi vertices to form the polygonal line comprises:
determining unidirectional sticks extending between two or more of the Voronoi vertices;
merging the unidirectional sticks using a clustering algorithm to form a segment; and
simplifying the segment by approximating a shape of the merged unidirectional sticks.

6. The method of claim 1, wherein the subterranean feature comprises quasi-linear feature.

7. A computing system, comprising:
one or more processors; and
a memory system comprising one or more non-transitory computer-readable media storing instructions that, when executed by at least one of the one or more processors, cause the computing system to perform operations, the operations comprising:
receiving seismic data representing a subterranean volume, at a server system;
transmitting a section of the seismic data to a thin client device;
determining, using the server system, a feature-likelihood attribute of at least a portion of a section of the seismic data, wherein the feature-likelihood attribute comprises values for elements of the section, the values being based on a likelihood that the individual elements represent part of a subterranean feature;
receiving an indication of an area in the section that includes a subterranean feature from the thin client device;
adjusting the feature-likelihood attribute, using the server system, for the indicated area in response to the area being indicated;
identifying, using the server system, contours of the subterranean feature in the area indicated based in part on the feature-likelihood attribute of the indicated area of the section, wherein identifying comprises approximating the subsurface feature as a polygon;
determining, using the server system, a polygonal line that approximates the subterranean feature in the area indicated, wherein determining the polygonal line includes extracting vertices of the polygon; and
transmitting data representing the subterranean feature in the section, based at least in part on the polygonal line, from the server system to the thin client device, wherein the thin client device causes a visualization of the section, including a representation of the subterranean feature in the section of the seismic data, to be displayed to a user.

8. The system of claim 7, wherein determining the feature-likelihood attribute comprises processing the section using a neural network to determine the values for the elements.

9. The system of claim 7, wherein determining the polygonal line comprises:
identifying edges of the subterranean feature;
generating a Voronoi diagram of the edges to determine Voronoi vertices representing the subterranean feature; and
connecting at least a portion of the Voronoi vertices to form the polygonal line.

10. The system of claim 9, wherein connecting the at least a portion of the Voronoi vertices to form the polygonal line comprises:
determining unidirectional sticks extending between two or more of the Voronoi vertices;
merging the unidirectional sticks using a clustering algorithm to form a segment; and
simplifying the segment by approximating a shape of the merged unidirectional sticks.

11. A non-transitory computer-readable medium storing instructions that, when executed by one or more processors of a computing system, cause the computing system to perform operations, the operations comprising:
receiving seismic data representing a subterranean volume, at a server system;
transmitting a section of the seismic data to a thin client device;
determining, using the server system, a feature-likelihood attribute of at least a portion of a section of the seismic data, wherein the feature-likelihood attribute comprises values for elements of the section, the values being based on a likelihood that the individual elements represent part of a subterranean feature;

receiving an indication of an area in the section that includes a subterranean feature from the thin client device;

adjusting the feature-likelihood attribute, using the server system, for the indicated area in response to the area being indicated;

identifying, using the server system, contours of the subterranean feature in the area indicated based in part on the feature-likelihood attribute of the indicated area of the section wherein identifying comprises approximating the subsurface feature as a polygon;

determining, using the server system, a polygonal line that approximates the subterranean feature in the area indicated, wherein determining the polygonal line includes extracting vertices of the polygon; and transmitting data representing the subterranean feature in the section, based at least in part on the polygonal line, from the server system to the thin client device, wherein the thin client device causes a visualization of the section, including a representation of the subterranean feature in the section of the seismic data, to be displayed to a user.

12. The medium of claim 11, wherein the operations further comprise causing a visualization of the polygonal line representing the subterranean feature to be displayed to a user.

13. The medium of claim 11, wherein determining the feature-likelihood attribute comprises processing the section using a neural network to determine the values for the elements.

14. The medium of claim 11, wherein determining the polygonal line comprises:
   identifying edges of the subterranean feature;
   generating a Voronoi diagram of the edges to determine Voronoi vertices representing the subterranean feature; and
   connecting at least a portion of the Voronoi vertices to form the polygonal line, comprising:
      determining unidirectional sticks extending between two or more of the Voronoi vertices;
      merging the unidirectional sticks using a clustering algorithm to form a segment; and
      simplifying the segment by approximating a shape of the merged unidirectional sticks.

15. The method of claim 1, wherein the data representing subterranean feature in the section that is transmitted to the thin client device comprises a line overlayed on the section that was previously transmitted to the thin client device.

16. The method of claim 1, wherein the elements comprise pixels or voxels in the section.

17. The method of claim 1, wherein the section is three-dimensional.

18. The method of claim 1, wherein identifying the contours of the subterranean feature comprises:
   applying a smoothing process to reduce noise in the area of the section;
   reducing the area from a gray level image to a binary image;
   applying an edge detector to the binary image to generate a binary array having dimensions equal to a height and width of the binary image, wherein the binary array comprises binary values representing whether or not individual pixels are part of a subterranean feature.

* * * * *